United States Patent
Scholten

(10) Patent No.: US 9,970,230 B2
(45) Date of Patent: May 15, 2018

(54) DEVICE FOR MONITORING A MACHINE MOVEMENT AND METHOD FOR MONITORING A MACHINE MOVEMENT

(71) Applicant: FRABA B.V., SG Heerlen (NL)

(72) Inventor: Lucien Scholten, Erkrath (DE)

(73) Assignee: FRABA B.V., SG Heerlen (NL)

( * ) Notice: Subject to any disclaimer, the term of this patent is extended or adjusted under 35 U.S.C. 154(b) by 322 days.

(21) Appl. No.: 14/826,215

(22) Filed: Aug. 14, 2015

(65) Prior Publication Data
US 2016/0047159 A1    Feb. 18, 2016

(30) Foreign Application Priority Data

Aug. 15, 2014  (DE) .......................... 10 2014 111 694
Mar. 18, 2015  (EP) ...................................... 15159635

(51) Int. Cl.
*E05F 15/74* (2015.01)
*E05F 15/78* (2015.01)
(Continued)

(52) U.S. Cl.
CPC .............. *E05F 15/74* (2015.01); *E05F 15/78* (2015.01); *E05F 15/79* (2015.01); *F16P 3/02* (2013.01);
(Continued)

(58) Field of Classification Search
CPC . E05F 15/74; E05F 15/78; E05F 15/79; E05F 2015/765; F16P 3/02; F16P 3/144; G01V 8/12; G05B 19/0428
See application file for complete search history.

(56) References Cited

U.S. PATENT DOCUMENTS 5,512,761 A * 4/1996 Winkelmann ........... A61B 6/08
                                                          250/559.27
6,023,335 A    2/2000 Wüstefeld
(Continued)

FOREIGN PATENT DOCUMENTS

DE     37 28 354 A1    3/1989
DE    100 38 025 A1    3/2002
(Continued)

OTHER PUBLICATIONS

Machine translation of EP 1835310, Rohbeck Volker Dr, Light grid, Sep. 19, 2007, 7 pages.*
(Continued)

*Primary Examiner* — Robert Fennema
*Assistant Examiner* — Tri T Nguyen
(74) *Attorney, Agent, or Firm* — Norman B. Thot

(57) ABSTRACT

A device for monitoring a machine movement of a movable constructional element includes a detecting device and a control device. The detection device comprises at least one transmission unit which transmits a signal, and a reception unit which receives the signal. The control device comprises an evaluation unit which evaluates the signal received at the reception unit. The control device allows the machine movement upon a receipt of the signal at the reception unit, and to output a first triggering pulse to stop the machine movement in an absence of the signal at the reception unit. The evaluation unit comprises a first threshold value measuring unit to detect a signal strength of the signal received at the reception unit and which, upon detection that a predetermined threshold value of a signal strength is fallen short of, outputs a second triggering pulse to stop the machine movement.

21 Claims, 4 Drawing Sheets

(51) Int. Cl.
    *E05F 15/79*     (2015.01)
    *G01V 8/12*     (2006.01)
    *G05B 19/042*     (2006.01)
    *F16P 3/02*     (2006.01)
    *F16P 3/14*     (2006.01)
    *E05F 15/73*     (2015.01)

(52) U.S. Cl.
    CPC ............... *F16P 3/144* (2013.01); *G01V 8/12* (2013.01); *G05B 19/0428* (2013.01); *E05F 2015/765* (2015.01)

(56) References Cited

U.S. PATENT DOCUMENTS

| | | |
|---|---|---|
| 2005/0224700 A1 | 10/2005 | Petra |
| 2008/0284594 A1 | 11/2008 | Meyer et al. |
| 2010/0325959 A1 | 12/2010 | De Coi et al. |
| 2011/0248154 A1* | 10/2011 | Ottleben ................ G01V 8/14 250/221 |

FOREIGN PATENT DOCUMENTS

| | | |
|---|---|---|
| DE | 102 03 145 C1 | 4/2003 |
| DE | 20 2008 009 320 U1 | 9/2008 |
| DE | 10 2008 023 294 A1 | 7/2009 |
| EP | 0 875 873 A1 | 11/1998 |
| EP | 1 993 081 A1 | 11/2008 |

OTHER PUBLICATIONS

Machine translation of EP 1870734, Klingelhoefer Dr Christian, Opto-electronic light curtain with at least two transmitting-receiving bars, Dec. 26, 2007, 7 pages.*

* cited by examiner

DEVICE FOR MONITORING A MACHINE MOVEMENT AND METHOD FOR MONITORING A MACHINE MOVEMENT

CROSS REFERENCE TO PRIOR APPLICATIONS

Priority is claimed to German Patent Application No. DE 10 2014 111 694.1, filed Aug. 15, 2014, and to European Patent Application No. 15159635, filed Mar. 18, 2015. The entire disclosure of each of said applications are incorporated by reference herein.

FIELD

The present invention relates to a device for monitoring a machine movement of a movable constructional element, particularly a door or a gate, the monitoring device comprising a detection device having at least one transmission unit for transmitting an optical signal and a reception unit for receiving the optical signal, and comprising a control device which, upon occurrence of a signal received at the reception unit, is operative to allow for the machine movement of the constructional element and, in the absence of a signal received at the reception unit, is operative to output a triggering pulse for stopping the machine movement of the constructional element. The present invention further relates to a method for monitoring a machine movement of a movable constructional element.

BACKGROUND

Protective and monitoring systems of the above type are often used in places where a moving range of a constructional element of a machine or device must be monitored to avoid collisions. Typical applications are found in passageways or driveways provided with automatically closing and/or motor-driven industrial doors.

A large variety of such monitoring systems are described in the prior art. DE 20 2008 009 320 U1, for example, describes a monitoring device comprising an optical protective device having a monitoring sensor for avoiding, for example, danger caused by moving machine parts in the door area. DE 37 28 354 describes protective systems for door arrangements, the systems comprising a transmission unit, a reception unit, a control unit, and light sources.

Due to their robust nature and their easy operability, such monitoring devices are often equipped with optical detection devices for detecting possible obstacles. These detection devices usually comprise a transmission unit and a reception unit, wherein an optical signal, for example, a light beam, is transmitted therebetween. A danger zone where a machine movement takes place can thereby be continuously monitored. When such a signal is interrupted by an obstacle in the danger zone, the control device will output a triggering pulse for stopping the machine movement.

A known problem in such detection devices resides in the occurrence of extraneous light or other situations causing a change of the light path, with a resultant risk of faulty detection or non-detection of a light signal. Such situations result, for example, from the fact that, due to their constructional design, the transmission unit and the reception unit will involve a certain lateral radiation of the transmitted and/or received optical signal, comparable to a headlight generating a light cone with a radiation angle. Prior art devices are therefore normally provided with certain constructional measures on the transmission and reception units, such as, for example, arrangement of a plurality of separate transmission/reception units, a relatively small radiation angle, and/or a relatively exact mutual alignment.

This has the disadvantage, however, that such devices are restricted in their availability and in their functionality, and are expensive to produce and install.

SUMMARY

An aspect of the present invention is to provide a device for monitoring a machine movement of a movable constructional element which avoids the above-mentioned disadvantages in the prior art, which allows for a safe and effective monitoring of a danger zone, and which, also in case of mutual superposition of optical signals and occurrence of reflections, will offer effective protection against collision with an obstacle. An additional aspect of the present invention is that the device be relatively inexpensive.

In an embodiment, the present invention provides a device for monitoring a machine movement of a movable constructional element which includes a detecting device and a control device. The detection device comprises at least one transmission unit configured to transmit an optical signal, and a reception unit configured to receive the optical signal. The control device comprises an evaluation unit configured to evaluate the optical signal received at the reception unit. The control device is configured to allow the machine movement upon a receipt of the optical signal at the reception unit, and to output a first triggering pulse to stop the machine movement in an absence of the optical signal at the reception unit. The evaluation unit comprises a first threshold value measuring unit configured to detect a signal strength of the optical signal received at the reception unit and which, upon detection that a predetermined threshold value of a signal strength is fallen short of, is configured to output a second triggering pulse to stop the machine movement.

BRIEF DESCRIPTION OF THE DRAWINGS

The present invention is described in greater detail below on the basis of embodiments and of the drawings in which.

DETAILED DESCRIPTION

Figure 1:
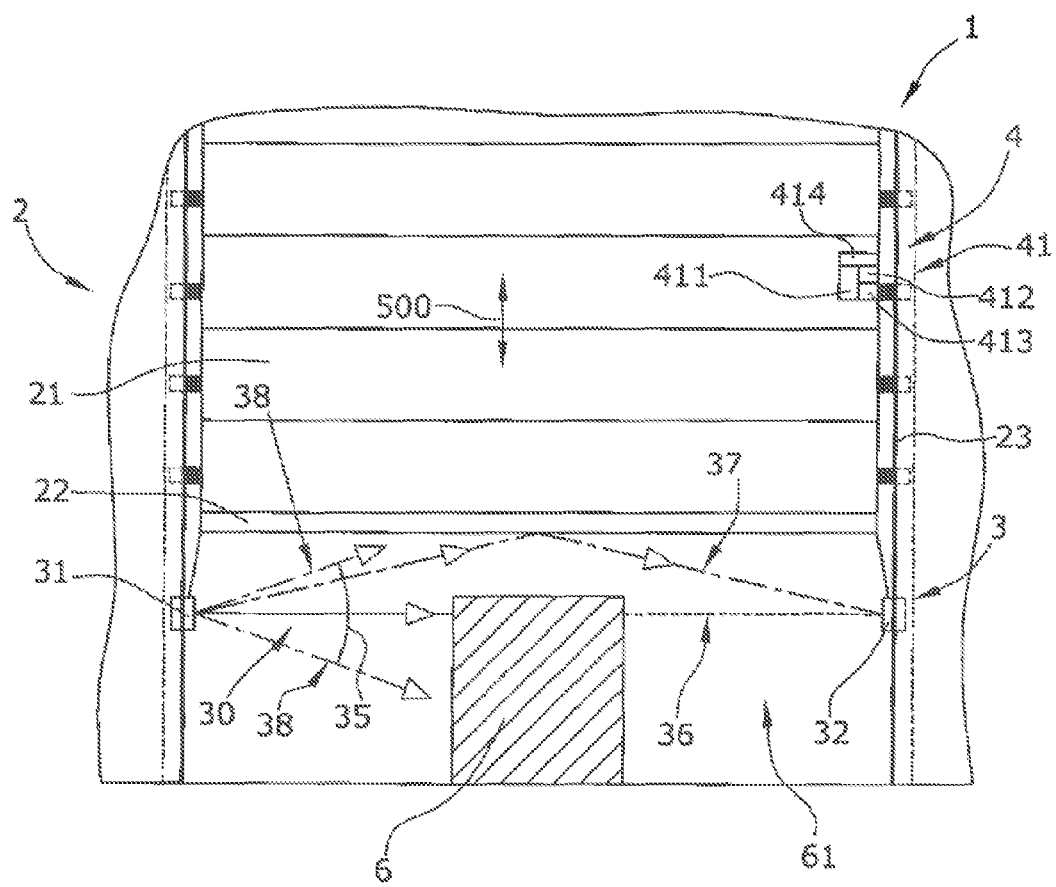
FIG. 1 schematically shows a rolling gate provided with a monitoring device according to a first embodiment of the present invention.

In an embodiment of the present invention, the control device comprises an evaluation unit for evaluating a signal strength of the signal received at the reception unit, wherein the evaluation unit comprises a first threshold value measuring unit which is adapted to detect a signal strength of the signal received at the reception unit and which, when a predetermined threshold value of the signal strength is fallen short of, will output a triggering pulse to stop the machine movement of the constructional element.

In an embodiment of the present invention, the control device can be arranged on the frame or on the movable constructional element and, for controlling a drive motor of the movable constructional element and/or of a machine, can, for example, be connected to a motor electronics of the drive motor. Upon detection of an obstacle, a triggering pulse for stopping the constructional element can thus be transmitted directly to the drive motor so that a temporal delay until standstill of the constructional element can be minimized.

In an embodiment of the present invention, the evaluation unit can, for example, be arranged in the area of the reception unit and can receive, as an input signal, an analog signal representing the received optical signal over time. In the evaluation unit, there can thus be evaluated the signal that is really received at the reception unit. For this purpose, the evaluation unit comprises a first threshold value measuring unit which will in particular evaluate the signal strength of the received optical signal. The signal strength of the optical signal can in particular allow for conclusions to be drawn as to whether an obstacle is present in the danger zone or whether there has merely occurred a reflection or optical superposition of the received signal. On the basis of the signal strength, it can in particular be detected whether, even though a signal is being received at the reception unit, there has occurred an interruption of the direct signal.

The reception unit will normally receive a weakened signals in case of an interruption of the direct signal and/or of the main beam and a continued transmission merely of a reflected part of the signal. This weakened signal can be sensed by the first threshold value measuring unit so that a triggering signal to stop the movement can be outputted not only in case of a complete absence of a received signal, but also already upon a detection of a defined weakening of the signal and/or of the signal strength. For this purpose, the first threshold value measuring unit is calibrated particularly to the effect that the optical signal to be received in case of a free path of travel of the constructional element will correspond to a summation value of the direct signal and a reflected part of the signal. Since a reflection or superposition of the optical signal will always cause minor variations in the intensity and/or strength of the signal, the threshold value of the signal strength to trigger the stoppage of the machine movement is adapted in a corresponding manner. For the machine movement to be stopped, a sufficiently large weakening of the signal strength will in particular be required. For this reason, the threshold value can be computed as a portion of an average value of the received signal strength. If, in correspondence thereto, the threshold value is traversed from above in a downward direction, i.e., is fallen short of, a triggering impulse will be outputted to stop the machine movement.

The triggering impulse can lead to complete standstill and/or complete switch-off of the movement of the constructional element. Continued travel will be possible, for example, only after actuation of release function, for example, by pressing a button. A release module can alternatively be provided which will allow for a continuation of travel after a lapse of the triggering signal or will effect a temporal delay until a continuation of travel, for example, when the signal has again attained the predetermined signal strength. The movement of the constructional element can thereby be performed in a fully automated manner without additional actuation. This makes it possible to achieve a safe and effective monitoring of the danger zone and a fully automated operation of the machine.

In an embodiment of the present invention, the evaluation unit can, for example, comprise a second threshold value measuring unit which is adapted to detect a rate of change of the signal strength of the signal received at the reception unit and which, upon detecting that a predetermined threshold value of the rate of change of the signal strength is exceeded, will output a triggering pulse to stop the machine movement of the constructional element. The second threshold value measuring unit can in particular be arranged parallel to the first threshold value measuring unit so that the received signal will be monitored in parallel both in the first threshold value measuring unit and in the second threshold value measuring unit. A temporal delay to stop the machine movement can thereby be minimized, and the monitoring device can work in a safer and more efficient manner.

The rate of change of the signal strength is defined to be the temporal change of the signal strength. A relatively fast and/or abrupt change of the signal strength will in particular indicate that an obstacle is present in the monitored movement range of the constructional element which interrupts the direct signal beam. For this reason, in case of a relatively abrupt change of the signal strength, a triggering pulse will be outputted to stop the machine movement of the constructional element. In case, however, that the change of the signal strength is relatively slow, this may be caused by an additional incident light, for example, from a passing vehicle, or by vibrations of the detection device during the movement of the constructional element. Particularly with very wide passages and/or gates, it may happen that the transmission unit and/or the reception unit are being moved relative to each other due to vibrations and that the direct optical signal in the area of the radiation angle is swinging back and forth and will thus cause changes in the received signal strength. Contamination on the detection unit such as, for example, a dust layer, or pollution of the air as caused, for example, by exhaust gases from vehicles, or other influences, may lead to a relatively slow decrease or increase of the signal strength. The signal strength will thus normally vary within a specific range. In these above-mentioned cases, stoppage of the movement of the constructional element is to be avoided because no obstacle exists. For this reason, a triggering pulse to stop the movement of the constructional element will not be outputted in the case of a relatively slow rate of change of the signal strength.

The triggering pulse of the second threshold value measuring unit can also lead to a complete stoppage of the constructional element, wherein, according to the above-described method, a continuation of travel can be performed by actuation of the release function or by a release module. In this case, an automatic release can take place after reception of the predetermined signal strength and a relatively fast rate of change of the signal strength.

In an embodiment of the present invention, the evaluation unit can, for example, comprise a differentiation device which is connected upstream of the second threshold value measuring unit and which is adapted to convert a rate of change of the signal strength of the signal received at the reception unit into an amplitude-shaped output signal. The differentiation device in particular comprises an output line which is connected to the second threshold value measuring unit so that the output signal from the differentiation device can be transmitted into the second threshold value measuring unit. The amplitude-shaped output signal represents the rate of change of the signal strength and can in particular be amplified. A relatively fast measurement of the rate of change of the signal strength can thereby be performed in the second threshold value measuring unit.

The first threshold value measuring unit and the second threshold value measuring unit can be connected in the evaluation unit so that, for stopping the machine movement of the constructional element, a triggering impulse must be outputted both by the first threshold value measuring unit and by the second threshold value measuring unit. An AND gate device can in particular be provided to which the first threshold value measuring unit and the second threshold value measuring unit are connected so that a control signal for stopping the movement of the constructional element will be outputted only if triggering pulses are outputted by both of the threshold value measuring units. If, however, a triggering pulse is outputted only by the first threshold value measuring unit or by the second threshold value measuring unit, then, for example, no control signal will be outputted at the AND gate device to stop the movement of the constructional element. A control signal to stop the movement of the constructional element can thereby be suppressed, for example, in case of a triggering pulse of the first threshold value measuring unit and an absence of a triggering pulse of the second threshold value measuring unit. This is necessary in particular in cases where, although a falling-short of the signal strength of the first threshold value measuring unit is detected, the rate of change of the signal strength during the decrease of the signal strength is relatively low, which allows the conclusion to be drawn that an optical superposition or reflection exists, but not an obstacle in the danger zone. An erroneous triggering can thus be effectively prevented.

In an embodiment of the present invention, the first threshold value measuring unit and/or the second threshold value measuring unit can, for example, be adapted to change a received analog signal into an output digital signal. It can thus be detected in a relatively simple manner on the basis of the output-side digital signal whether or not a triggering pulse exists, i.e., a falling short and/or an exceeding of a threshold value. If a triggering pulse does exist, a digital signal will be transmitted, and if no triggering pulse exists, no digital signal will be transmitted. In this arrangement, the first threshold value measuring unit and/or the second threshold value measuring unit can, for example, be designed as a Schmitt trigger. The evaluation unit can thereby be designed in a relatively simple and inexpensive manner.

In an embodiment of the present invention, the first threshold value measuring unit and/or the second threshold value measuring unit can, for example, be integrated in a microprocessor. The microprocessor can comprise the entire control device of the monitoring device and/or the motor electronics of the drive of the constructional element. This allows for a central control of the machine movement of the constructional element. The control device can also be integrated into an overall control system in an inexpensive manner.

In an embodiment of the present invention, the evaluation unit can, for example, comprise a time module which is adapted to detect the temporal duration of the falling short of the threshold value of the signal strength and/or the exceeding of the threshold value of the rate of change and which, when a predetermined minimum duration is exceeded, will output a triggering pulse. An erroneous triggering in case of a weakening of the signal that has not been caused by an obstacle and/or in case of absence of a signal can thereby be avoided. The minimum duration can also be computed and/or predetermined as a portion of an average value.

The control device and/or the evaluation unit can be integrated into the detection device, particularly in the transmission unit and/or reception unit. The monitoring device can thereby have a relatively compact design.

The detection device and/or the control device can be arranged on a gate or a door, particularly on the closing edge of a gate or door. The detection device can thereby be designed as a light barrier preceding the gate. For this purpose, the transmission unit can be placed on first side of the gate and the reception unit can placed on a second side of the gate opposite to the first side. Alternatively, the transmission unit and the reception unit can be arranged on the same side of the gate and can in particular be designed as a reflex light barrier having an opposite reflector. According to an alternative embodiment of the present invention, the detection device can, for example, be stationary, for example, be arranged on a frame of the gate. A gate is generally to be understood in the sense of any random type of a gate, particularly a section gate, a sheet gate, a sliding gate, or a rolling gate.

In an embodiment of the present invention, the detection device can, for example, be a light barrier, a light grid, or a light curtain. This makes it possible to achieve a particularly wide-surfaced detection range and thus a particularly effective protection from collision with an obstacle.

For spanning such a light grid or light curtain, the detection device can comprise at least two separate transmission units and/or at least two separate reception units. In a light grid or curtain, each individual light beam traversing the danger zone can thereby be transmitted by a respective transmission unit and be received by a respective reception unit. For this purpose, each transmission unit can, for example, have a respective reception unit assigned to it. It can thereby be detected in a relatively simple manner in which part of the danger zone a detected obstacle is located. Stoppage of the machine movement can thereby be temporally delayed in cases where, for example, due to the position of the obstacle in the danger zone, collision onto the obstacle is to be expected only after a certain continuation of the machine movement. In an embodiment of the present invention, there can be provided merely one transmission unit and a plurality of reception units, or also a plurality of transmission units and merely one reception unit, wherein, for spanning a light grid or light curtain, the optical signals can be deflected by auxiliary means, such as, for example, reflectors. The detection device can generally be arranged in the plane of the path of travel of the rolling gate. By way of alternative, it is also possible to arrange the detection device at a lateral distance from this plane so that the rolling gate will not traverse the signal beams.

In an embodiment of the present invention, the at least two separate transmission units and/or the at least two separate reception units can, for example, be activated at the same time via a common switch. The transmission units can in particular be activated via a first switch and the reception unit can be activated via a second switch, each at the same time. The transmission units and the reception units can alternatively be activated in common at the same time via one switch. This makes it possible to carry out the transmission and/or reception of the individual signals at identical times so that the danger zone will be traversed by each signal beam not successively, but at identical times. This allows for a relatively fast and safe detection of an obstacle in the danger zone. No complex pulsing or modulation of the individual signal beams is further required, thereby rendering the detection device as relatively inexpensive in production and installation.

In an embodiment of the present invention, on the transmitter side, a signal distributor device can, for example, be provided which divides the signal transmitted by the transmission unit, which signal is also called the total signal, into two separate signal partial beams. In this case, the dividing of the total signal can be performed in a non-uniform manner so that a first signal partial beam has a higher signal intensity and/or signal strength than the second signal partial beam. This is of advantage particularly in a signal distributor device of the type wherein more than one division of the signal beam is performed, so that a subsequent division will be considered and, ultimately, the signal partial beams traversing the danger zone will each have substantially the same signal intensity and/or signal strength. Merely one transmission unit is thus required to generate a light grid and/or curtain, so that the detection device is relatively inexpensive.

For bundling the individual signal partial beams traversing the danger zone, a signal bundling device can be provided on the receiver side by which at least two separate signal partial beams will be bundled into one common signal. The total signal bundled into a common signal and forwarded in the direction of the reception unit will thus be the sum of at least two signal partial beams, particularly a sum of the signal intensity and/or signal strength of the at least two signal partial beams. Merely one reception unit is therefore required to receive a light grid and/or curtain, thereby making the detection device relatively inexpensive.

The signal distributor device and/or the signal bundling device be an arrangement comprising at least one reflection surface such as, for example, a mirror or reflector. The reflection surface can be semi-permeable in such an arrangement. On the transmitter side, a first signal partial beam can thus be deflected by a first reflection surface in the direction of the danger zone, and a second signal partial beam can pass through the first reflection surface in a substantially straight-linear manner. This second signal partial beam which has passed through the first reflection surface can be deflected, at a further, subsequent second reflection surface on the transmitter side, into the direction of the danger zone, or it can again pass in a substantially straight-linear manner and can be divided, at a subsequent third reflection surface, into further signal partial beams. Spanning a light grid or light curtain is thus made possible in a relatively simple manner. On the receiver side, a reverse process can take place in that, by an impermeable first reflection surface, a first signal partial beam coming from the direction of the danger zone will be completely deflected in the direction of the reception unit. At a semi-impermeable second reflection surface arranged between the first reflection surface and the reception unit, the first signal partial beam can pass through in a substantially straight-linear manner in the direction of the reception unit, while a second signal partial beam coming from the danger zone can be deflected on the second reflection surface in the direction of the reception unit and be superposed onto the first signal partial beam. In this case, the signal intensity and signal strength of the second signal partial beam can, for example, be added to that of the first signal partial beam. At a further, subsequent third reflection surface on the receiver side, a further signal partial beam can be deflected and added to the receiver-side signal. The bundled total signal on the receiver side is thus formed by the sum of the signal strength and/or signal strength of the signal partial beams coming from the danger zone. Reception of the signal partial beams of a light grid or light curtain is thereby made possible in a relatively simple manner.

The transmission unit and/or the reception unit can be arranged within a guide rail of the movable constructional element. The transmission unit and/or the reception unit can in particular be arranged in a guide rail or guardrail in which the constructional element is moveably supported and/or guided. The detection device can, for example, be attached to the rolling gate and be located within a fixed frame arranged laterally on the rolling gate and/or be at least partially surrounded by the frame. It is thereby possible to monitor an area extending across the whole width of the constructional element. This is suitable especially for passages and driveways.

The present invention also provides a method for monitoring a machine movement of a movable constructional element, particularly a door or a gate, the method comprising the following steps: transmitting an optical signal from a transmission unit to a reception unit, receiving the signal at a reception unit, evaluating a signal strength of the signal received at the reception unit in a first threshold value measuring unit and, upon detection that a predetermined threshold value of the signal strength is fallen short of, outputting to the control device a triggering pulse to stop the machine movement, evaluating the signal strength in a second threshold value measuring unit and, upon detection that a predetermined threshold value of the rate of change of signal strength is exceeded, outputting to the control device a triggering pulse to stop the machine movement, and interlinking the triggering pulses output by the first threshold value measuring unit and the second threshold value measuring unit in an AND gate device and, upon occurrence of a triggering pulse both from the first threshold value measuring unit and from the second threshold value measuring unit, outputting, to a motor electronics of a drive of the constructional element, a triggering signal to stop the machine movement of the constructional element. In this manner, a particularly fast and efficient monitoring of the machine movement can be performed.

When evaluating the signal received at the reception unit, there can be detected the duration of the falling-short of the threshold value of the signal strength and/or the duration of the exceeding of the threshold value of the rate of change wherein, upon detection that a predetermined minimum duration is exceeded, a triggering pulse will be outputted. The minimum duration can be computed or preset.

In an embodiment of the present invention, the threshold value of the signal strength and/or the threshold value of the rate of change can, for example, be computed as a portion of an average value. The respective threshold value can thereby be made available in a relatively simple manner and can be individualized and/or adapted with regard to other marginal conditions, such as, for example, the moving speed of the constructional element.

After transmission of the signal, the signal can, for example, be distributed and/or spread to form at least two separate signal partial beams. The generating of a light grid or light curtain will thereby require merely one transmission unit so that the detection system is of a relatively simple design and is thus inexpensive.

In an embodiment of the present invention, prior to reception of the signal, at least two separate signal partial beams can, for example, be bundled into a total signal. Reception of the signal partial beams of a light grid or light curtain is thereby rendered possible in a relatively simple and inexpensive manner. Only one reception unit is further needed.

In an embodiment of the present invention, in the evaluation of the signal received at the reception unit, superposition and/or reflection of adjacent signal partial beams is considered. In the evaluation of the signal strength of the signal received at the reception unit in the first threshold value measuring unit, superposition and/or reflection of adjacent signal partial beams will in particular be considered. As soon an object appears in the danger zone, one of the signal partial beams will be weakened, thereby effecting a weakening of the sum of the signal strengths detected at the reception unit, which can be detected and will trigger a stopping of the machine movement. In this manner, monitoring the machine movement can be performed in a particularly safe and efficient manner.

The present invention will hereafter be described in greater detail by way of an example under reference to the accompanying drawings.

FIG. 1 shows the usual application of the device 1 for monitoring a movement 500 of a movable constructional element 2. In the present example, the device 1 serves as a monitoring and protective device for an automatically operated rolling gate 21 and comprises a detection device 3 and a control device 4. The rolling gate 21 serves to open and close a driveway 61 and, driven by a motor, can be moved up and down. Rolling gate 21 consists of a plurality of interconnected gate segments laterally supported in a guide rail 23 for movement therein. On a bottom side of rolling gate 21, a closing edge 22 is arranged which by which the rolling gate 21 will abut a bottom of driveway 61 in the closed state. The closing edge 22 is normally made of stainless steel, aluminum, or steel and thus can comprise a reflective surface.

Detection device 3 is arranged below the closing edge 22 of rolling gate 21 and in particular comprises a transmission unit 31 for transmitting an optical signal 30 and a reception unit 32 for receiving the optical signal 30. For establishing a defined distance between detection device 3 and closing edge 22, the transmission unit 31 and the reception unit 32 are fastened to a web or metal sheet projecting downwardly from closing edge 22. Detection device 3 thus forms a detection system preceding the rolling gate 21 during the closing or downward movement 500, wherein the distance between detection device 3 and closing edge 22 is provided in accordance with a required delay time for collision-free stoppage of the rolling gate after detection of an obstacle. The transmission unit 31 and the reception unit 32 are each fastened at an outermost lateral end of rolling gate 21 and are at least partially surrounded by the guide rail 23 of rolling gate 21 so that the entire width of the driveway 61 can be monitored by detection device 3. In order to avoid an impact of detection device 3 on the bottom of driveway 61 when the rolling gate 21 is being fully closed, a recess (not shown in FIG. 1) for immersion and/or reception of the detection device 3 is arranged in the bottom, in the area of the guide rail 23. According to another embodiment of the present invention (not shown in FIG. 1) the detection device 3 can be arranged in stationary manner on the fixed frame 23 wherein, in this case, the detection device 3 is, for example, adapted to form a so-called light curtain approximately across the whole width and height of driveway 61. In case of such a stationary detection device 3, the relative movement of rolling gate 21 with respect to detection device 3 may happen to cause increased reflections and thus a varying signal strength.

In the present example, detection device 3 is designed as a light barrier, wherein a light beam 30 will be emitted by a photo transmission unit 31 and will be received by a photo reception unit 32. For design-inherent reasons, the optical signal 30 transmitted by transmission unit 31 in the direction of reception unit 32 comprises a radiation and/or scattering angle 35. It should be evident that the scattering angle 35 is not restricted to the plane shown in FIG. 1, but is rotationally symmetric, thus spanning a light cone originating from the transmission unit. The optical signals and/or light beams situated on the outer side of the light cone are marked by 38. In the present example, the optical signals 30 are scattered across such a large width that they cannot be detected anymore by the reception unit 32, at least not via a direct connection line. Also the reception unit 32 can comprise, for reception of the optical signal 30, a scattering angle 35 as described above. In the ideal case (as shown in FIG. 1), the transmission unit 31 and the reception unit 32 are aligned in a manner relative to each other so that, in both units 31, 32, a direct light beam 36, the main beam, is respectively situated in the angle bisector of the scattering angle 35. The direct light beam 36 thus extends along the shortest connection path between transmission unit 31 and reception unit 32. In this case, transmission unit 31 and reception unit 32 are exactly centrally aligned relative to each other.

Apart from the direct light beam 36, which in the present example according to FIG. 1 is interrupted by an obstacle 6, and the outer light beams 38 delimiting a light cone, the optical signal 30 further comprises reflected light beams 37. The reflected light beam 37 will be transmitted by transmission unit 31 at a specific angle relative to the direct light beam 36 and will be incident onto the closing edge 22 at about the middle of the driveway 61 and/or the rolling gate 21. At this site, the reflected light beam 37 will be reflected on the closing edge 22 and will be radiated in the direction of reception unit 32 at an angle of reflection approximately corresponding to the angle of incidence. Because of the scattering angle 35 of reception unit 32, also the reflected light beam 37 can also be received in reception unit 32.

As shown in FIG. 1, the reflection of reflected light beam 37 may happen to have the effect that an obstacle 6 located in the moving range and/or danger zone of rolling gate 21 will be bypassed by the optical signal 30 and will thus not be detected. At the reception unit 32, there will thus be received (in spite of the obstacle 6 and the interruption of the direct light beam 36) a partial signal in reflected light beam 37. In conventional monitoring systems, this would not lead to stoppage of the machine movement 500 because a part of the partial signal 37 transmitted by transmission unit 31 would be received further on and, thus, no triggering pulse for stoppage would be generated. As a consequence, the rolling gate 21 would impact onto the obstacle 6. In order to avoid such an occurrence, there is herein provided a control device 4 comprising an evaluation unit 41.

In the present example, the control device 4 is attached to the rolling gate 21 while, according to an alternative embodiment, it can also be arranged in a stationary manner. Control device 4 comprises an evaluation unit 41. The evaluation unit 41 serves to evaluate a signal strength 33 of the optical signal 30 received at reception unit 32. Evaluation unit 41 comprises a first threshold value measuring unit 411, a differentiation device 413, a second threshold value measuring unit 412 and an AND gate device 414.

Figure 2:
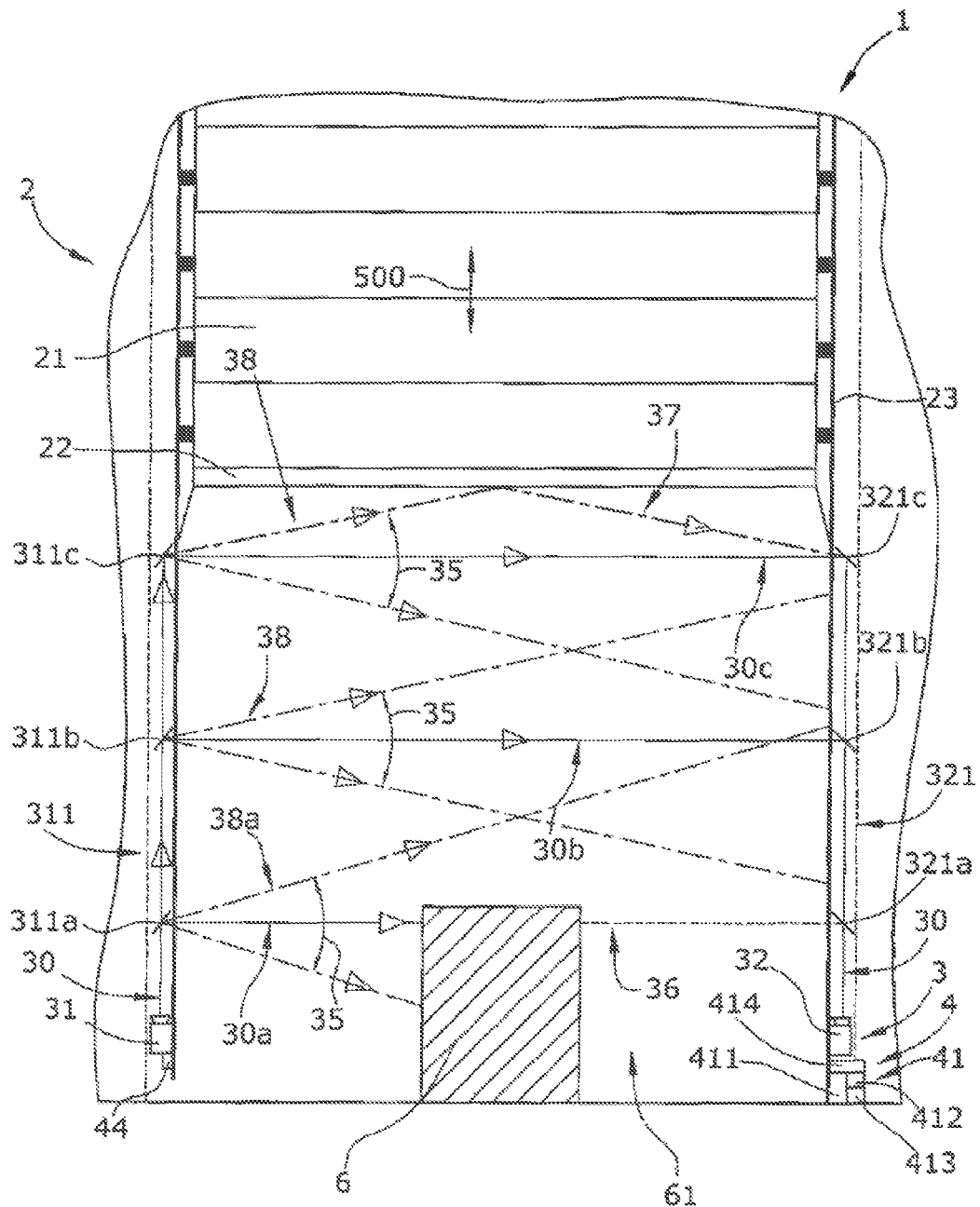
FIG. 2 schematically shows a rolling gate provided with a monitoring device according to a second embodiment of the present invention.

FIG. 2 shows a second embodiment of the device 1 for monitoring a movement 500 of a movable constructional element 2. The device 1 shown in FIG. 2 substantially corresponds to the device 1 shown in FIG. 1, wherein, in the present exemplary embodiment, the detection device 3 is designed for generating a light grid. For this purpose, the detection device 3 additionally comprises, apart from a transmission unit 31 for transmitting an optical signal 30 and a reception unit 32 for receiving the optical signal 30, a signal distributor device 311 and a signal bundling device 321.

Again, detection device 3 serves to monitor a danger zone below a rolling gate 21, particularly during the downward movement 500 of the gate. The transmission unit 31 and the reception unit 32 are again arranged at respective opposite edges of the danger zone, which in the present example is a gateway 61, and particularly on the fixed frame 23 of the rolling gate 21. Thus, in the present example, the detection device 3 cannot be moved along with the rolling gate 21. However, it can also be provided that the detection device 3 shown in FIG. 2 is arranged on the bottom side 22 of rolling gate 21, which, however, is not shown in the present case.

By means of detection device 3, a light grid is spanned into gateway 61, said light grid comprising a plurality of optical signals and/or light partial beams 30a, 30b, 30c arranged horizontally at a defined distance relative to each other. The three signal partial beams 30a, 30b, 30c will traverse the danger zone below rolling gate 21. Detection device 3 thereby forms a detection system preceding the rolling gate 21 during the closing and/or downward movement 500, allowing for a particularly early detection of an obstacle 6. Thus, for instance, in case of the presence of an obstacle 6 which is situated in the driveway of rolling gate 21 but at a sufficient distance to the bottom edge 22 of rolling gate 21, a stoppage of the downward movement 500 of rolling gate 21 can be temporally delayed. In this manner, in case the obstacle 6 is quickly removed, unnecessary stops of the rolling gate 21 can be avoided.

For spanning the light grid, a signal distributor device 311 is provided which comprises two semi-permeable mirrors 311a, 311b and an impermeable mirror 311c. Thereby, the optical signal 30 transmitted by the transmission unit 31 can be split into three signal partial beams 30a, 30b, 30c. In this arrangement, the mirrors 311a, 311b, 311c are permeable in such a manner that each signal partial beam 30a, 30b, 30c substantially has the same signal strength. For design-inherent reasons, the signal partial beams 30a, 30b, 30c deflected in the direction of the danger zone by the signal distributor device 311 and/or by the mirrors 311a, 311b, 311c each have a radiation angle and/or scattering angle 35. The scattering angle 35 is rotationally symmetrical so that, each time, there is spanned a light cone originating from the mirrors 311a, 311b, 311c. The signals and/or light beams situated outside on the light cone are marked by 38 and/or 38a. In the present example, the signal partial beam 30a is, by light cone 38a, scattering across such a width that, on the receiver side, the light cone of signal partial beam 30a partially reaches all the way to an adjacent mirror 321b of signal bundling device 322.

On the receiver side, via the signal bundling device 322 which comprises an impermeable mirror 321c and two semi-permeable mirrors 321a, 321b, the three signal partial beams 30a, 30b, 30c will be bundled into a sole total signal beam 30 and guided in the direction of reception unit 32. Herein, the optical signal 30 bundled on the receiver side has a signal strength corresponding to the sum of the signal strengths of the individual signal partial beams 30a, 30b, 30c. As soon as one of the signal partial beams 30a, 30b, 30c is interrupted (as in the preset case), the signal partial beam 30a by obstacle 6, the signal strength of the receiver-side total signal 30 will decrease, which will be detected in evaluation unit 41 and be further processed in control device 4.

Figure 3:
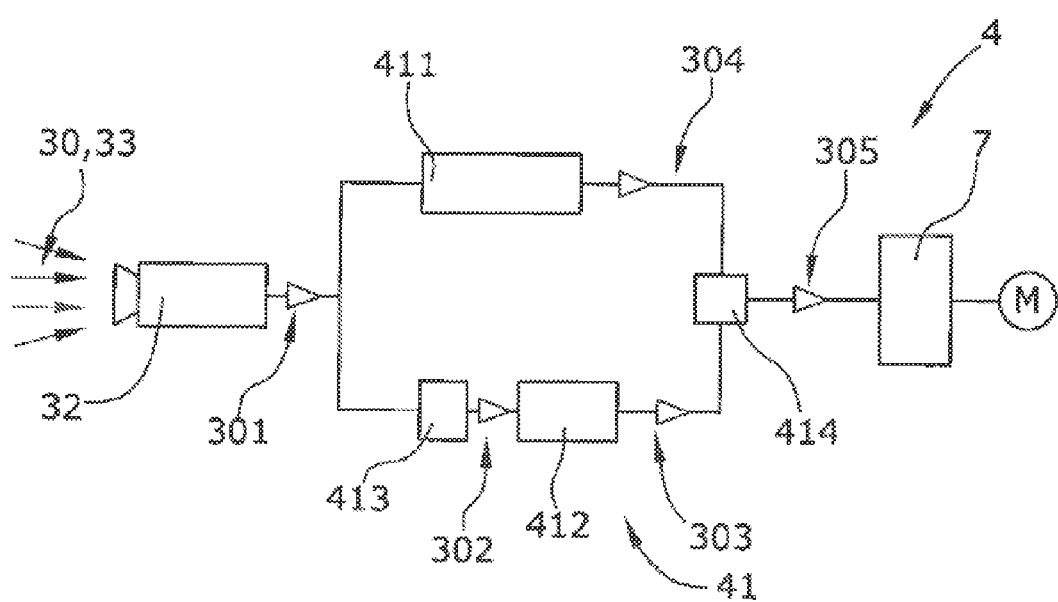
FIG. 3 schematically shows the interconnection of a control device of a monitoring device according to the present invention.

For allowing a better understanding of the processes in control device 4, the circuitry of the evaluation unit 41 according to the present invention is schematically shown in FIG. 3.

At reception unit 32, the optical signal 30 transmitted by transmission unit 31 will be at least partially received. Reception unit 32 will receive the optical signal 30 in a continuous manner, wherein, at an output of reception unit 32, an analog signal 301 will be made available which represents the signal strength 33 of the received optical signal 30 over time. In the evaluation unit 41, there can be detected, on the basis of the signal strength 33 of optical signal 30, a danger situation caused by the movement 500 of rolling gate 21, particularly by an obstacle 6. For this purpose, the output signal 301 of reception unit 32 will be transmitted both into a first threshold value measuring unit 411 and into a differentiation device 413 of evaluation unit 41.

The first threshold value measuring unit 411 is adapted to detect the signal strength 33 of the optical signal 30 received at reception unit 32 and, if it is detected that a predetermined signal strength 33 is fallen short of, will output to the AND gate device 414 a triggering pulse 304 to stop the movement 500 of the rolling gate 21. Such a falling-short is the case, for example, if the direct light beam 36 is interrupted. In the first threshold value measuring unit 411, the analog output signal 301 will be converted into a digital signal 304. In case of an analog output signal 301 below the threshold value 411a, a triggering pulse 304 will be output by the first threshold value measuring unit 411. Otherwise, no output pulse 304 will be applied.

The differentiation device 413 is connected upstream of the second threshold value measuring unit 412. In the differentiation device 413, the analog signal 301 will be filtered and amplified in that the rate of change 34 of the signal strength 33 will be converted into an amplitude-shaped analog signal 302. The amplitude-shaped signal 302 will be transmitted to the second threshold value measuring unit 412 where the analog signal 302 will be converted into a digital signal.

The second threshold value measuring unit 412 is adapted to detect the rate of change 34 of the signal strength 33 of the optical signal 30 received at reception unit 32 and, if it is detected that a predetermined threshold value 412a of the rate of change 34 of the signal strength 33 is exceeded, said second threshold value measuring unit 412 will output to the AND gate device 414 a triggering pulse 303 for stopping the movement 500 of the rolling gate 21. Particularly in case of an analog signal 302 above the threshold value 412a, a triggering pulse 303 will be output. This can be the case, for example, if an abrupt change occurs due to an obstacle 6 entering into the path of the direct light beam 36. In case of an analog signal 302 below the signal strength 412a, however, no triggering pulse 303 will be output. In such a case, an optical superposition and/or reflection will be assumed.

The triggering signal 304 output by the first threshold value measuring unit 411 and the triggering signal 303 output by the second threshold value measuring unit 412 will be transmitted to an AND gate device 414 in which a logical interlinking is performed to the effect that a digital output control signal 305 for stopping the movement 500 of rolling gate 21 will be outputted by the AND gate device 414 only in case of a presence both of a triggering signal 303 of the first threshold value measuring unit 411 and of a triggering signal 304 of the second threshold value measuring unit 412. The control signal 305 generated in the AND gate device 414 will be transmitted, by control device 4, to a motor electronics 7 and will there effect an immediate stop of a drive motor M of rolling gate 21. For this purpose, the AND gate device 414 is connected, via a connection, to the motor electronics 7 of a drive motor M of rolling gate 21.

Figures 4, 5:
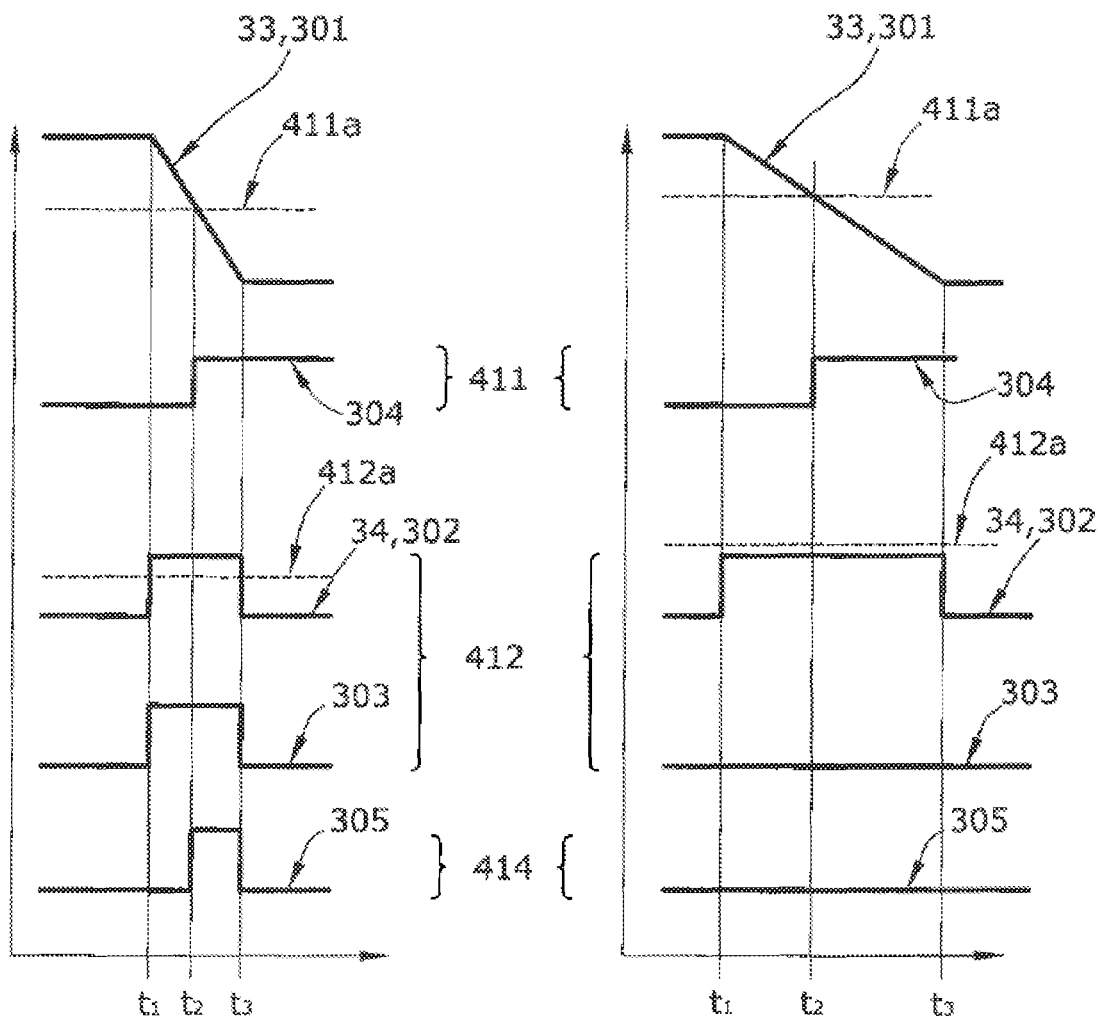
FIG. 4 schematically shows the signal developments of a monitoring device according to the present invention in the case that an obstacle is present.
FIG. 5 schematically shows the signal developments of a monitoring device according to the present invention upon occurrence of vibrations.

FIG. 4 schematically shows the signal developments over time t, as provided by the present invention, during the monitoring of a movement 500 of a rolling gate 21 in the presence of an obstacle 6. The phase of the entry of the obstacle 6 into the light cone (scattering angel) 35 is marked by t1. The obstacle 6 will cause a rapid weakening of the optical signal 30 received at reception unit 32 and thus a rapid weakening of the analog output signal 301 of the reception unit 32. The output signal 301 will decrease and, at t2, will fall below a predetermined threshold value 411a of the signal strength 33 and, below this threshold value 411a, will remain at a residual value. This (largely constant) residual value of the signal strength 33 is indicative of the reception of a reflecting signal portion 37. For this reason, the signal strength 33 does not drop to a value "zero" but merely has a distinctly lower value than before.

In the first threshold value measuring unit 411, the falling-short of the predetermined threshold value 411a of the signal strength 33 will be detected at t2, and a corresponding digital triggering pulse 304 will be generated, which is shown in FIG. 4 by way of the second curve from above.

In the second threshold value measuring unit 412, the amplitude-shaped output signal 302 of differentiation device 413 will be evaluated, which is shown in FIG. 4 by way of the third curve from above. The output signal 302 is relatively large because, due to the obstacle 6 entering into the light beam 36, the rate of change 34 of the signal strength 33 is relatively high. In correspondence thereto, the exceeding of a predetermined threshold value 412a of the rate of change 34 will be detected in the range from t1 to t3. Correspondingly, at the second threshold value measuring unit 412, a digital triggering pulse 303 will be generated in the range from t1 to t3, which is shown in FIG. 4 by way of the fourth curve from above.

The triggering pulses 303, 304 will both arrive in the AND gate device 414 where, for the temporal range in which both a triggering pulse 303 and a triggering pulse 304 are present, in the present example the range from t2 to t3, an output signal 305 will be generated to control a motor electronics 7, which correspondingly will lead to a stoppage of the drive motor M of rolling gate 21. Output signal 305 is shown in FIG. 4 by way of the fifth curve from above.

FIG. 5 schematically shows the signal developments over time t, as provided by the present invention, during the monitoring of a movement 500 of a rolling gate 21 in a situation of gradually occurring optical changes, for example, due to vibrations of rolling gate 21. In this case, an output signal 301 of reception unit 32 will be weakened as a result of an optical change, particularly by deflection or reflection of a portion of optical signal 30. The phase of entry of the vibrations and/or of the reflection of the optical signal 30 is marked by t1. The analog output signal 301 will then slowly decrease, will fall short of a predetermined threshold value 411a of the signal strength 33 at t2 and will stay below this signal strength 411a. The remaining signal strength 33 exists particularly because of the signals 37, 38 which are arranged outside on the light cone and are still receivable at the reception unit 32.

In the first threshold value measuring unit 411, the falling short of the predetermined threshold value 411a will be detected and a corresponding triggering pulse 304 will be generated, which is shown in FIG. 5 by way of the second curve from above.

In the second threshold value measuring unit 412, the amplitude-shaped output signal 302 of the differentiation device 413 will be evaluated, and an exceeding of a predetermined threshold value 412a of the rate of change 34 will not be detected. This is because, at the occurring vibrations, the signal strength change rate 34 is relatively low, which in FIG. 5 is shown by way of the fourth curve from above.

In the AND gate device 414, there can now be detected only a triggering pulse 303. A triggering pulse 304 does not exist. In this case, no output signal 305 will thus be outputted to the motor electronics 7. The rolling gate 21 will thus not be stopped since no obstacle 6 was detected.

The present invention is not limited to embodiments described herein; reference should be had to the appended claims.

REFERENCE NUMERALS 1 device
2 constructional element
21 rolling gate
22 closing edge/bottom side
23 guide rail/fixed frame
3 detection device
30 optical signal/light beam
30a first signal partial beam/first light partial beam
30b second signal partial beam/second light partial beam
30c third signal partial beam/third light partial beam
31 transmission unit/photo transmission unit
311 signal distributor device
311a first distributor surface/reflection surface/first semi-permeable mirror
311b second distributor surface/reflection surface/second semi-permeable mirror
311c third distributor surface/reflection surface/impermeable mirror
32 reception unit/photo reception unit
321 signal bundling device
321a first bundling surface/reflection surface/adjacent mirror/first semi-permeable mirror
321b second bundling surface/reflection surface/second semi-permeable mirror
321c third bundling surface/reflection surface/impermeable mirror
33 signal strength
34 rate of change
35 radiation angle/light cone/scattering angle
36 direct light beam
37 reflected light beam/reflecting signal portion/partial signal
38 outer light beam on light cone
4 control device
41 evaluation unit
411 first threshold value measuring unit
411a threshold value of signal strength
412 second threshold value measuring unit
412a threshold value of rate of change
413 differentiation device
414 AND gate device
42 microprocessor
43 release module
44 switch
301 analog signal corresponding to signal strength
302 analog signal
303 digital signal/triggering pulse
304 digital signal/triggering pulse 305 control signal/digital output control signal/control signal
500 movement of constructional element
6 obstacle
61 driveway/gateway
7 motor electronics
M drive motor

What is claimed is:

1. A device for monitoring a machine movement of a movable constructional element, the device comprising:
 a detection device comprising at least one optical signal transmitter, and an optical signal receiver;
 a control device comprising an evaluation unit configured to evaluate the optical signal received at the optical signal receiver, the control device being configured,
  to allow the machine movement upon a receipt of the optical signal at the optical signal receiver, and,
  to output a first triggering pulse to stop the machine movement in an absence of the optical signal at the optical signal receiver; and
 wherein, the evaluation unit comprises,
  a first threshold value measuring unit configured to detect a signal strength of the optical signal received at the optical signal receiver and which, upon detection that a predetermined threshold value of a signal strength is fallen short of, is configured to output a second triggering pulse to stop the machine movement, and
  a second threshold value measuring unit configured to detect a rate of change of the signal strength of the optical signal received at the optical signal and which, upon detection that a predetermined threshold value of the rate of change of the signal strength is exceeded, is configured to output a third triggering pulse to stop the machine movement, and Wherein, the control device stops the machine movement based on the first triggering pulse, the second triggering pulse or the third triggering pulse.

2. The device as recited in claim 1, wherein the evaluation unit further comprises:
 a filtering and amplifying device connected upstream of the second threshold value measuring unit, the filtering and amplifying device being configured to convert the rate of change of the signal strength of the optical signal received at the optical signal receiver into an amplitude-shaped output signal.

3. The device as recited in claim 1, wherein the first threshold value measuring unit and the second threshold value measuring unit are connected so that, to stop the machine movement, the first threshold value measuring unit must output the second triggering pulse and the second threshold value measuring unit must output the third triggering pulse.

4. The device as recited in claim 1, wherein at least one of,
 the first threshold value measuring unit is further configured to change a first received analog signal into a first output digital signal as the second triggering pulse, and
 the second threshold value measuring unit is further configured to change a second received analog signal into a second output digital signal as the third triggering pulse.

5. The device as recited in claim 1, characterized in that at least one of the first threshold value measuring unit and the second threshold value measuring unit are integrated in a microprocessor.

6. The device as recited in claim 1, wherein the evaluation unit further comprises a timer configured to detect a duration of at least one of,
 the falling short of the predetermined threshold value of the signal strength, and
 the exceeding of the predetermined threshold value of the rate of change, and to output a fourth triggering pulse when a predetermined minimum duration is exceeded.

7. The device as recited in claim 1, wherein at least one of the control device and the evaluation unit are integrated into the detection device.

8. The device as recited in claim 1, wherein at least one of the detection device and the control device are arranged on a gate.

9. The device as recited in claim 1, wherein the detection device is provided as a light barrier, a light grid, or a light curtain.

10. The device as recited in claim 1, wherein the detection device comprises at least one of,
 at least two optical signal transmitters, and
 at least two optical signal receivers.

11. The device as recited in claim 10,
 further comprising a switch,
 wherein, at least one of the at least two optical signal transmitters and the at least two optical signal receivers are configured to be activated at a same time via the switch.

12. The device as recited in claim 1, further comprising a signal distributor device configured to divide the optical signal into at least two signal partial beams on a transmitter side.

13. The device as recited in claim 12, further comprising a signal bundling device configured to bundle at least two of the at least two signal partial beams into the optical signal on a receiver side.

14. The device as recited in claim 13, wherein at least one of,
 the signal distributor device is provided as an arrangement comprising at least one reflection surface, and
 the signal bundling device is provided as an arrangement comprising at least one reflection surface.

15. The device as recited in claim 1,
 further comprising a guide rail in which the moveable constructional element is moveably supported,
 wherein, at least one of the at least one optical signal transmitter and the optical signal receiver are arranged in the guide rail.

16. A method for monitoring a machine movement of a movable constructional element, the method comprising:
 transmitting a signal from a transmission unit so as to provide a transmitted signal;
 receiving at least a part of the transmitted signal at a reception unit so as to provide a received signal;
 evaluating the received signal at the reception unit in a first threshold value measuring unit and, upon detection that a predetermined threshold value of a signal strength of the received signal is fallen short of, outputting a first triggering pulse to a control device to stop the machine movement;
 evaluating the received signal at the reception unit in a second threshold value measuring unit and, upon detection that a predetermined threshold value of a rate of change of the signal strength of the received signal is exceeded, outputting a second triggering pulse to the control device to stop the machine movement;
 interlinking the first triggering pulse and the second triggering pulse in an AND gate device and, upon occurrence of the first triggering pulse and the second triggering pulse, outputting a triggering signal to a motor electronics to stop the machine movement; and stopping the machine movement based on the triggering signal.

17. The method as recited in claim 16, wherein, when evaluating the received signal at the reception unit, the method further comprises:

detecting a duration of at least one of, the falling short of the predetermined threshold value of the signal strength, and the exceeding of the predetermined threshold value of the rate of change and, upon detection of an exceeding of a predetermined minimum duration; and outputting the triggering signal.

18. The method as recited in claim 16, wherein the method further comprises:

computing at least one of the predetermined threshold value of the signal strength and the predetermined threshold value of the rate of change as a portion of an average value.

19. The method as recited in claim 16, wherein, after transmitting the signal, the method further comprises:

spreading the signal into at least two separate signal partial beams.

20. The method as recited in claim 19, wherein, prior to receiving the signal, the method further comprises:

bundling at least two separate signal partial beams into the signal.

21. The method as recited in claim 19, wherein, in the evaluating of the signal received at the reception unit, the method further comprises:

considering at least one of a superposition and a reflection of the at least two support signal partial beams which are adjacent.

* * * * *